3,403,087
PHOTOCHEMICAL PROCESS FOR THE PRODUCTION OF HALOGENATED FLUORIMINO COMPOUNDS

Douglas H. Dybvig, St. Paul, Minn., assignor to Minnesota Mining and Manufacturing Company, St. Paul, Minn., a corporation of Delaware
No Drawing. Filed Mar. 30, 1966, Ser. No. 539,613
6 Claims. (Cl. 204—158)

This invention relates to processes for the production of fluorimino compounds.

It has been proposed previously to produce fluorimino compounds by the direct fluorination of various nitrogen-containing organic materials. Investigations which have been made show such processes to be extremely energetic and difficult to control, resulting in a wide variety of degradation products and undesirable carbonaceous decomposition products. Reductive defluorination of difluoramino compounds has also been used to produce fluorimino compounds.

It is an object of this invention to provide a process utilizing photolysis with ultraviolet light for halogenation and removal of at least one difluoramino group of difluoramino-group containing fluoramidine compounds to yield fluorimino compounds. It is a further object of this invention to provide a process for converting N,N',N'-trifluoroformamidino compounds into fluorimino compounds by photolysis.

In accordance with the invention, there has been provided a process for the production of compounds having the formula

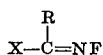

wherein X is chlorine or fluorine, R is chlorine, fluorine, difluoramino or perfluoroalkyl having from 1 to 18 carbon atoms, which comprises subjecting a compound having the formula

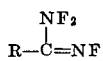

wherein R is the same as above, to the action of ultraviolet light or the combined action of ultraviolet light and chlorine, to replace a difluoramino group thereof with chlorine or fluorine. When R is perfluoroalkyl, a preferred group is lower perfluoroalkyl, i.e. having 1 to 5 carbon atoms.

The reactions invloved may be illustrated as follows:

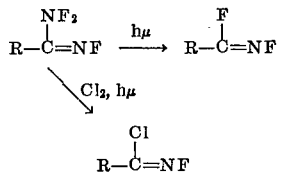

In these equations, R has the same significance as hereinabove.

Broadly speaking, the temperature and pressure of the reactants is not critical and can be varied widely. It is convenient to work with pressures slightly in excess of 1 atmosphere. The temperature used can be in the range of $-78°$ to $100°$ C.

The ultraviolet or actinic light useful for the purposes of the process is that having wavelengths shorter than about 4000 A. A mercury vapor arc lamp having strong output in the ultraviolet produces satisfactory actinic light for the process of the invention.

Typical reaction conditions for the process are as follows. The reaction is performed in a Pyrex glass bulb which has been coated on the inside with a thin layer of a fluorocarbon grease (such as "Kel-F" brand grease). This coating may be achieved by rinsing the bulb with an acetone solution of the grease with subsequent evaporation of the acetone. The bulb is cooled to allow vacuum transfer of the reactants into the bulb which is then evacuated to remove non-condensible gases. After the contents of the vessel have warmed to room temperature, the vessel is irradiated with an ultraviolet source such as an Hanovia 100-watt mercury arc lamp placed approximately 3 inches from the reactor. A quartz reactor may be used, but the shorter wavelengths transmitted by quartz tend to degrade the fluorimino compounds, thus reducing the yield. The reaction is allowed to continue for approximately 1 to 6 hours, depending upon the choice of starting materials. Completion of the reaction is conveniently established by infrared analysis of the mixture.

Purification of the products is conveniently performed by preparative-scale chromatography using for example, a stationary phase of 33 percent by weight "Kel-F" Oil 8126 (a fluorocarbon oil), on 30/60 acid-washed Chromosorb P (a diatomaceous earth-type filter aid).

N,N',N'-trifluoroformamidino compounds are converted directly to the corresponding fluorimine simply by photolytic decomposition. In these cases a Pyrex bulb (coated with fluorocarbon grease) is charged with the N,N',N'-trifluoroformamidino compound at liquid nitrogen temperature, warmed to room temperature and irradiated with an ultraviolet lamp.

The starting compounds used in the process may be prepared by the direct fluorination of nitrogen compounds. For example, perfluoroguanidine is obtained by the direct fluorination of ammeline. The preparation of N,N',N'-trifluoroformamidino compounds of the type

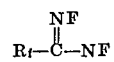

is described in the copending application for United States Letters Patent of Robert J. Koshar et al., Ser. No. 351,581, wherein 1-difluoramino-n-perfluorobutane is converted to 1-fluorimino-n-perfluorobutane with cyclopentadienyliron, then treated with anhydrous ammonia and finally fluorinated to yield 1-difluoramino-1-fluorimino-n-perfluorobutane.

Because many of the compounds used in this work contain a high portion of fluorine bound to nitrogen, and may be explosive, i.e. shock or heat sensitive, a suitable barricade and safety equipment such as heavy gauntlets and face shield should be used. It is recommended that the process be carried out using only small batch amounts of reactants.

The compounds produced by the process of the invention are useful as starting materials for chemical reactions based on the reactivity of the fluorimino group.

The following examples, in which all parts are by weight unless otherwise specified, are given for illustrative purposes and should not be considered as limiting the scope of the claimed process.

Example 1

A 500-ml. borosilicate glass bulb, coated with "Kel-F" grease, is charged witth 150 mg. of perfluoroguanidine and 640 mg. of chlorine. After warming to room temperature, the reaction mixture is irradiated for 19 hours at 80° C. Gas chromatographic separation of the products yields 35 mg. of C-chlorotrifluoroformamidine, $$ClC(=NF)NF_2$$

as the syn and anti isomers in the ratio of 2.5 to 1.

When 200 mg. of 1-difluoramino-1-fluorimino-n-perfluorobutane are used in the process, 1-fluorimino-1-chloro-n-heptafluorobutane is obtained.

Example 2

A grease coated quartz bulb is charged with 18 parts of perfluoroformamidine and irradiated for 13.5 hours at 25° C. Gas chromatographic separation gives perfluoromethylenimine in a yield of about 28 percent of theoretical.

What is claimed is:

1. Process for the produtcion of compounds of the formula

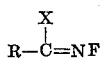

wherein X is chlorine or fluorine, R is chlorine, fluorine, difluoramino or perfluoroalkyl having 1 to 18 carbon atoms, which consists essentially in subjecting a compound of the formula

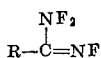

wherein R is the same as set forth hereinabove, to the combined action of ultraviolet light and chlorine, to replace a difluoramino group thereof with chlorine.

2. A process according to claim 1, in which the starting compound is perfluoroguanidine.

3. A process according to claim 1, in which the starting compound is perfluoroformamidine.

4. Process for the production of compounds of the formula

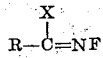

wherein X is chlorine or fluorine, R is chlorine, fluorine, difluoramino or perfluoroalkyl having 1 to 18 carbon atoms, which consists essentially in subjecting a compound of the formula

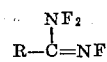

wherein R is the same as set forth hereinabove, to the action of ultraviolet light, to replace a difluoroamino group thereof with fluorine.

5. A process according to claim 4, in which the starting compound is perfluoroguanidine.

6. A process according to claim 4, in which the starting compound is perfluoroformamidine.

References Cited

Dybvig: "American Chemical Society," Abstracts of Papers, 148th meeting, 1964, page 9K.

HOWARD S. WILLIAMS, *Primary Examiner.*